(12) United States Patent
Eager

(10) Patent No.: US 8,306,837 B2
(45) Date of Patent: Nov. 6, 2012

(54) SHIPMENT OPTION SELECTION METHOD

(75) Inventor: Donald M. Eager, Milford, CT (US)

(73) Assignee: Neopost Technologies, Bagneux (FR)

( * ) Notice: Subject to any disclaimer, the term of this patent is extended or adjusted under 35 U.S.C. 154(b) by 577 days.

(21) Appl. No.: 12/357,742

(22) Filed: Jan. 22, 2009

(65) Prior Publication Data

US 2010/0185476 A1 Jul. 22, 2010

(51) Int. Cl.
*G06Q 10/00* (2006.01)
(52) U.S. Cl. .................................................. 705/7.11
(58) Field of Classification Search ................. 705/7.11
See application file for complete search history.

(56) References Cited

U.S. PATENT DOCUMENTS

2009/0094078 A1* 4/2009 Kaehne ............................ 705/7
2009/0210313 A1 8/2009 Winebrake et al.

* cited by examiner

*Primary Examiner* — Shannon Campbell
(74) *Attorney, Agent, or Firm* — Morris & Kamlay LLP

(57) ABSTRACT

A computer-implemented method of offering shipment options for selection is disclosed. The method includes receiving shipment-related criteria from a user and defining at one or more one shipment options that meet the shipment-related criteria. Environmental data corresponding to the shipment options are received and an corresponding environmental impacts, based on the environmental data, are determined. The method further includes displaying the shipment option with the corresponding environmental impact to the user and storing a selection by the user of one shipment option of the one or more shipment options.

18 Claims, 9 Drawing Sheets

FIG. 2

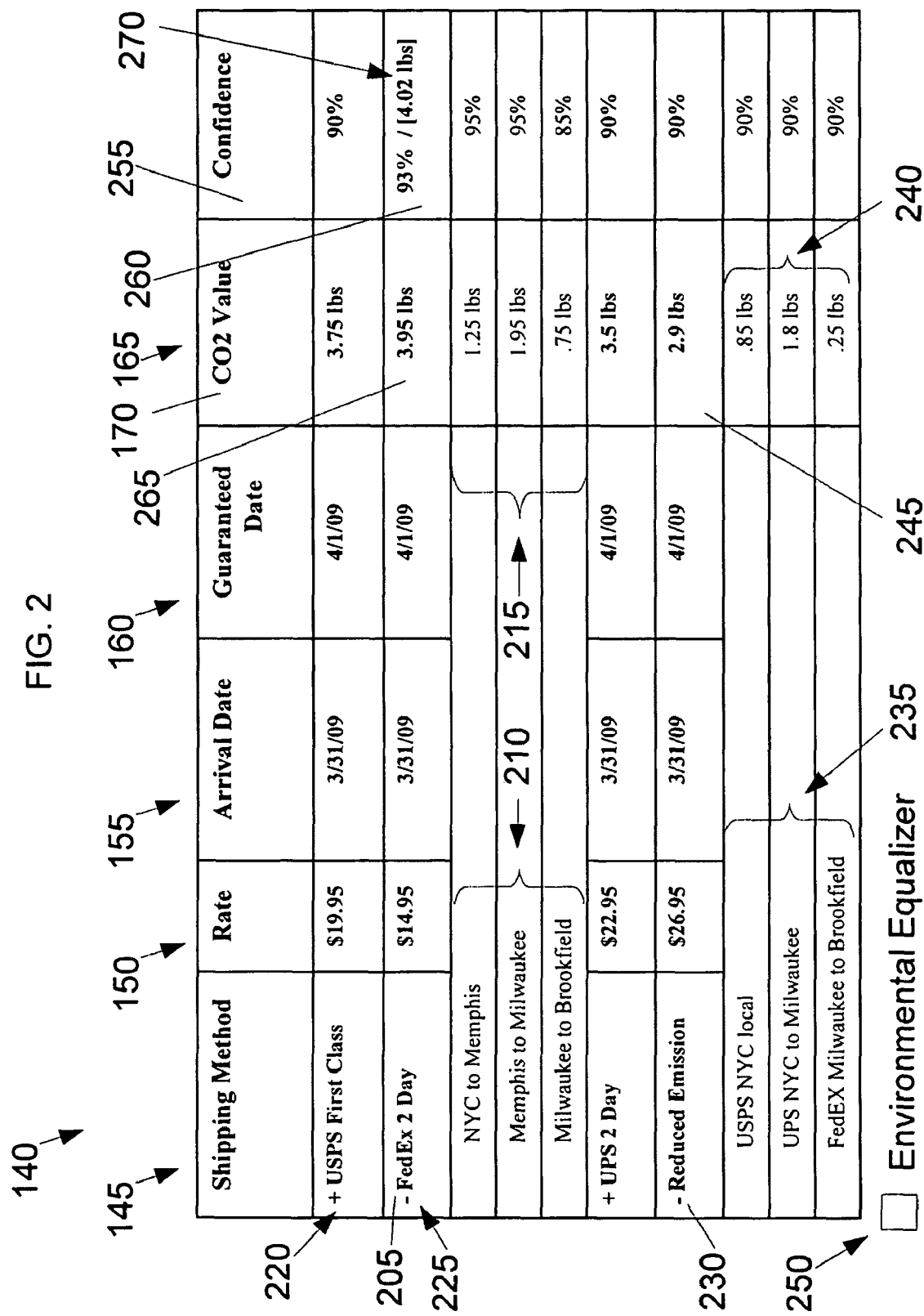

| Shipping Method | Rate | Arrival Date | Guaranteed Date | CO2 Value | Confidence |
|---|---|---|---|---|---|
| + USPS First Class | $19.95 | 3/31/09 | 4/1/09 | 3.75 lbs | 90% |
| − FedEx 2 Day | $14.95 | 3/31/09 | 4/1/09 | 3.95 lbs | 93% / [4.02 lbs] |
| NYC to Memphis | | | | 1.25 lbs | 95% |
| Memphis to Milwaukee | | | | 1.95 lbs | 95% |
| Milwaukee to Brookfield | | | | .75 lbs | 85% |
| + UPS 2 Day | $22.95 | 3/31/09 | 4/1/09 | 3.5 lbs | 90% |
| − Reduced Emission | $26.95 | 3/31/09 | 4/1/09 | 2.9 lbs | 90% |
| USPS NYC local | | | | .85 lbs | 90% |
| UPS NYC to Milwaukee | | | | 1.8 lbs | 90% |
| FedEX Milwaukee to Brookfield | | | | .25 lbs | 90% |

☐ Environmental Equalizer

SHIPMENT OPTION SELECTION METHOD

BACKGROUND OF THE INVENTION

Present selection of shipment services is managed from either a carrier provided shipping application, such as UPS WORLDSHIP, or a multi-carrier shipping application, such as Neopost FRIENDSHIP NAVIGATOR, for example. These applications may include a "rate shopping" component that presents a selection of available shipment service options to a user. Available shipment service options may be categorized to include a "best time option" or "least expensive" option. Present shipping applications typically limit the types of shipment service options available to those that are directly based on the cost, distance, and/or transit time, and do not consider other metrics when presenting comparisons of shipment service options.

BRIEF DESCRIPTION OF THE INVENTION

An embodiment of the invention includes a computer-implemented method of offering shipment options for selection. The method includes receiving shipment-related criteria from a user and defining one or more shipment options that meet the shipment-related criteria. The method further includes receiving environmental data corresponding to each shipment option and determining an environmental impact that is based on the environmental data that corresponds to each shipment option. The shipment options are displayed with the corresponding environmental impact to the user, and user selection of one shipment option is stored.

A further embodiment of the invention includes a computer-implemented method of offering shipment options for selection. The method includes receiving shipment-related criteria from a user and defining one or more shipment options that meet the shipment-related criteria. The method further includes receiving provided environmental impact information corresponding to each shipment option and actual environmental data corresponding to at least a portion of each shipment option. Using the actual environmental data, the method generates a confidence factor for the provided environmental impact information. The options, the provided environmental impact information, and the confidence factor are displayed to the user, and a selection of one shipment option is received from the user.

A further embodiment of the invention includes a computer-implemented method of offering shipment options for selection. The method includes receiving shipment-related criteria from a user and defining one or more shipment options that meet the shipment-related criteria. The method further includes receiving a shipment route and provided environmental impact corresponding to each shipment option from at least one carrier and determining an estimated environmental impact corresponding to each shipment option. Determining the estimated environmental impact includes adjusting the provided environmental impact based on at least one of analyzing an estimated environmental impact of a hypothetical shipment option and comparing the provided environmental impact to actual environmental data. The method further includes verifying an accuracy of the provided environmental impact. The one shipment options are displayed with the corresponding estimated environmental impact to the user. A selection received from the user of one of the shipment options is stored.

A further embodiment of the invention includes a system for providing environmental impact information relating to at least one shipping option, the system including a user interface configured to receive criteria defining a desired shipment, a route selector to identify a shipment option that meets the criteria, a communication interface to receive projected environmental data related to the shipment option; and, an environmental impact estimator to calculate the environmental impact of the shipment option based on the projected environmental data.

These and other advantages and features will be more readily understood from the following detailed description of embodiments of the invention that is provided in connection with the accompanying drawings.

BRIEF DESCRIPTION OF THE DRAWINGS

Referring to the exemplary drawings wherein like elements are numbered alike in the accompanying Figures:

FIG. 2 depicts an exemplary shipping method table generated by the environmental estimator in accordance with an embodiment of the invention;

DETAILED DESCRIPTION OF THE INVENTION

Figure 1:
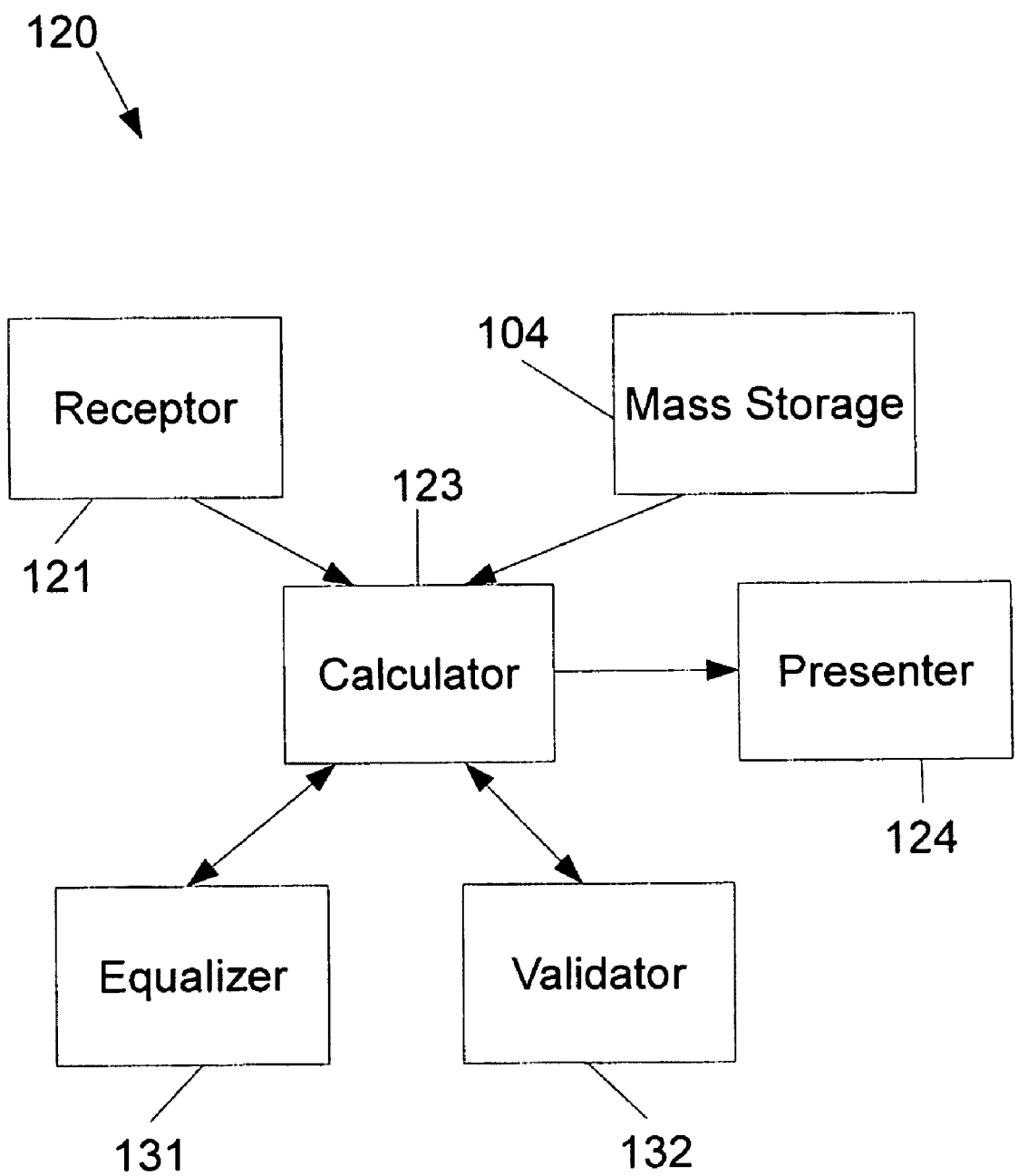
FIG. 1 depicts a block schematic diagram of an exemplary environmental impact estimation system in accordance with an embodiment of the invention.

An embodiment provides a quantified representation of physical, environmental impacts related to available shipment service options (also herein referred to as a "shipment option"). Users have the ability to select an appropriate shipment service option with knowledge of the environmental impact of doing so. Further embodiments provide arrangements to increase accuracy of the quantification.

DEFINITIONS

"Environmental information" (also herein referred to as "environmental impact") provides a quantified measure of the degree to which a shipment service option is believed to negatively impact the environment. As a specific example, environmental information may include the amount of $CO_2$ a shipment service option is believed to emit. Environmental information may be quantified, such as where a specific measurement is provided (e.g., 60 lbs. of $CO_2$), or it may include a relative or judgment-based measure, such as where one shipment service option is identified as having a lower environmental impact than a second shipment service option, but specific quantities are not provided. For a particular shipment service option, the environmental information may be calculated based at least in part on provided environmental information, estimated environmental information, or a combination thereof.

"Provided environmental information" (also herein referred to as "provided environmental impact") refers to environmental information provided by a shipment service carrier that corresponds to a shipment service option.

"Estimated environmental information" (also herein referred to as "estimated environmental impact") refers to environmental information derived or obtained for the purpose of verifying or enhancing an accuracy of the provided environmental information. Estimated environmental information may be calculated independently of any provided environmental information, or it may be based at least in part on related provided environmental information.

"Hypothetical environmental information" represents environmental information that corresponds to hypothetical shipment criteria defined for deriving estimated environmental information.

In accordance with the foregoing, "provided hypothetical environmental information" represents carrier provided hypothetical environmental information and "estimated hypothetical environmental information" represents hypothetical information derived or obtained for enhancing an accuracy of provided environmental information.

"Environmental data" may include environmental information and may also describe, estimate, or specifically indicate an input used to calculate environmental information of an aspect of a shipment service option. For example, environmental data may include the amount and type of emissions expected for various modes of transportation, the likelihood of additional emission caused by additional shipments to a certain area, etc. Other examples of environmental data can include distance of transportation, method of transportation (aircraft, truck, etc.), physical constants, engineering data, environmental impact of facilities associated with shipment, and operational/industrial information (equipment utilized by specific carriers, equipment capacities and capabilities, and carrier-specific location of local depots, air transport locations, and sorting facilities). Such data may have numerous sources, and can be available directly from the carriers, from public records such as corporate Annual Reports and regulatory publications (e.g.: Securities and Exchange Commission Filings; Federal Aviation Administration Reports; etc.), and from third party information sources such as consulting firms, environmental interest groups, and universities. The environmental data can be dynamic, similar to shipping rates and additional surcharges of carriers, for example.

"Provided environmental data" refers to environmental data provided by a shipment service carrier and corresponds to a shipment service option.

FIG. 1 depicts a block schematic diagram of an exemplary environmental impact estimation system 120 (also herein referred to as an "environmental estimator"). The environmental estimator 120 includes an information receptor 121, a mass storage device 104, an impact calculator 123, and an impact presenter 124. Some embodiments of the environmental estimator 120 can include one or more features, components, or modules to enhance a value of environmental impact information, such as an impact equalizer 131 and an impact validator 132, as will be described in further detail below.

The information receptor 121 receives shipment-related criteria and provides the shipment-related criteria to the impact calculator 123. Shipment-related criteria are used to ascertain one or more available, appropriate shipment service options. Exemplary shipment-related criteria include: a shipment origin location; a shipment destination location; shipment physical characteristics (such as size and/or weight); a shipment initiation date; and a shipment arrival date.

In response to receiving the shipment-related criteria, the impact calculator 123 receives at least one available shipment service option that meets the shipment-related criteria, analyzes environmental data within the mass storage device 104 and retrieves, from the mass storage device 104, environmental data that corresponds to the available shipment service option that meets the shipment-related criteria.

Using the shipment-related criteria and the environmental data, the impact calculator 123 calculates quantified environmental impact information and provides the quantified environmental impact information to the environmental impact presenter 124.

FIG. 2 depicts an exemplary shipping method table 140 generated by the environmental estimator 120 and presented by the environmental impact presenter 124. The table 140 allows user selection of an available shipment service option that meets the user provided shipment-related criteria, and typically provides information such as shipment carrier, cost, arrival date, guaranteed date, etc.

For example, a first column 145 of the table 140 includes available shipment service options, a second column 150 includes rates (costs) associated with each of the available service shipment options, and third 155 and fourth 160 columns display expected and guaranteed shipment destination arrival dates, respectively. A fifth column 165 provides an example of the environmental impact information associated with each of the available shipment options displayed in the first column 145.

As described above, while the fifth column 165 is titled "CO2 Value" 170, and the information is presented in units of pounds, other embodiments are contemplated to include other indications (either absolute or relative) of a negative environmental impact resulting from selection of the corresponding shipment service option.

Figure 3:
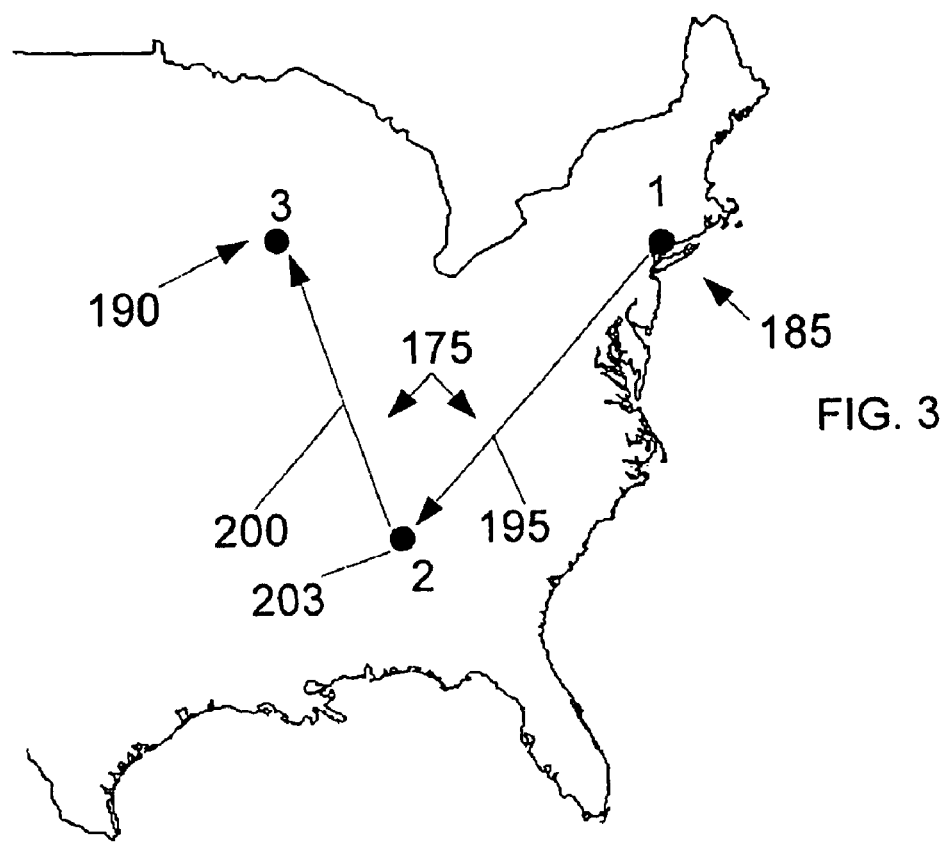
FIG. 3 depicts a map including an exemplary shipment route in accordance with an embodiment of the invention.
Figure 4:
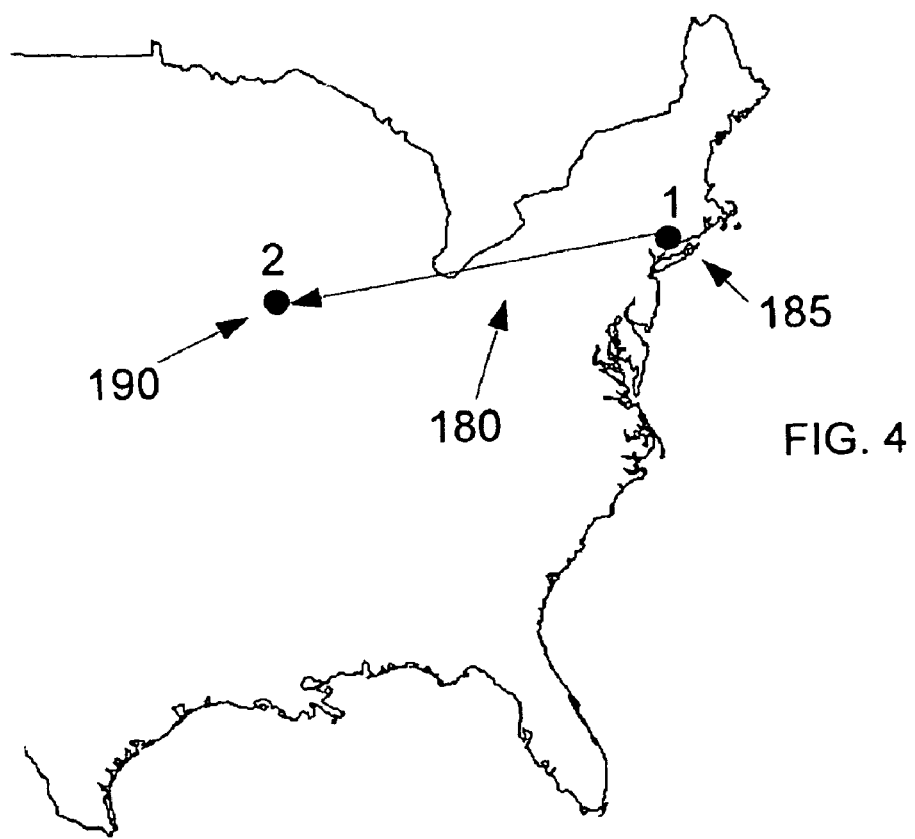
FIG. 4 depicts a map including an exemplary shipment route in accordance with an embodiment of the invention.

FIG. 3 and FIG. 4 depict a first and second exemplary shipment route 175, 180, for a same geographic origin 185 and destination 190. As an example, routes 175, 180 both correspond to an origin 185 of New York City, N.Y. and destination 190 of Brookfield, Wis.

In general, the environmental impact for each shipment service option can be calculated by defining separate segments (also herein referred to as "route segments") of each route 175, 180, receiving environmental data corresponding to each route segment, calculating the environmental impact from each segment, apportioning a share of the environmental impact for the segment to the shipment option, and aggregating the shares. It will be appreciated that, as used above, reference herein to "environmental impact" (or "environmental information") shall refer to environmental information in the general sense, and is contemplated to include provided environmental information as well as estimated environmental information.

As an illustrative example, the route 175 depicted in FIG. 3 includes a first portion 195 and second portion 200. The first portion 195 includes segments that are defined by environmental impacts associated with transportation from the origin 185 to Memphis, Tenn. 203, where a carrier sorting facility is located. The second portion 200 includes segments that are defined by environmental impacts associated with transportation from Memphis, Tenn. 203 to the destination 190.

Accordingly, five exemplary segments and corresponding environmental data within the first portion 195 are defined as follows: Transportation via a natural gas truck from the origin 185 to a local carrier depot; Transportation via a diesel truck from local carrier depot to a NY airport; Transportation via a Boeing 757 Jet from a NY airport to a TN airport; Transportation via a diesel truck from the TN airport to a sorting facility; and activities within the sorting facility.

Using environmental data, the environmental impact of each segment may be calculated. One example is generation of 5 pounds of carbon by transportation from the origin 185 to the local carrier depot. One illustrative calculation includes determining a per mile carbon generation factor of the natural gas truck multiplied by the distance in miles from the origin to the local carrier depot. Another illustrative calculation includes determining an hourly rate of carbon generation factor of the natural gas truck multiplied by the number of hours of operation. It will be appreciated that differences in calculation approaches can yield different results, as will be discussed in further detail below.

The environmental impact of each segment is then apportioned to the shipment service option of interest. One illustrative apportionment includes determining, based upon the environmental data from storage 104 and shipment-related criteria input to the receptor 121, a ratio of a volume of the shipment service option to a volume capacity of the natural gas truck, and apportioning the environmental impact of the truck based upon the ratio of volumes. Another illustrative apportionment includes determining a total number of shipments made by the natural gas truck during an operational period thereof and apportioning the environmental impact of the truck to the shipment service option based upon the total number of shipments made by the truck.

In a similar manner, environmental impacts are calculated and apportioned to each segment within each portion of each route for each shipment service option. These apportioned impacts are aggregated and displayed within the fifth column 165 of the table 140.

With reference to FIG. 3 and FIG. 4, initial examination thereof may lead to conclusion that the second route 180 results in less environmental impact than the first route 175. However, it will be appreciated that shipment-related criteria and environmental data, such as equipment selection, condition, efficiency, and capacity may provide an unexpected result that selection of the first route 175 results in less environmental impact as compared to selection of the second route 180. This unexpected result provides a benefit to users that may need to control the environmental impact of their shipping activity.

Figure 5:
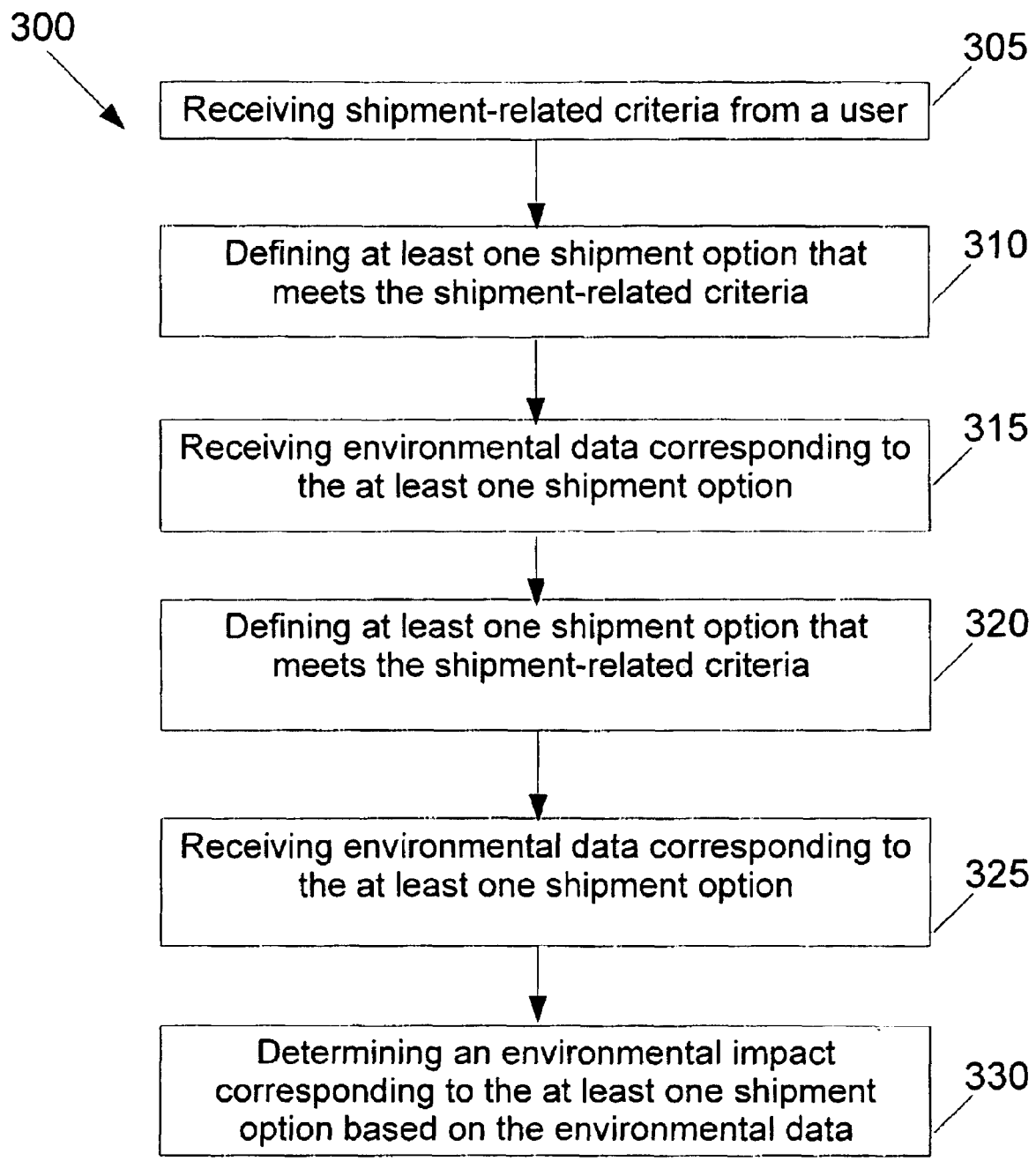
FIG. 5 depicts a flowchart of process steps for a method of offering shipment options for selection in accordance with an embodiment of the invention.

In view of the above, FIG. 5 depicts a flowchart 300 of exemplary process steps for a method of offering shipment options for selection. The method begins at step 305 with receiving shipment-related criteria, via the receptor 121, from a user. The method continues at step 310 with defining one or more shipment options that meet the shipment-related criteria received from the user. At step 315, the method proceeds by receiving, at the calculator 123, environmental data corresponding to each of the shipment options that meet the shipment-related criteria. Step 320 includes determining an environmental impact corresponding to each of the shipment options. Step 325 includes displaying, via the presenter 124, the one or more options with the corresponding environmental impact to the user. Step 330 includes storing a user selection of one of the one or more shipment within data storage 104.

An embodiment may provide additional detail relating to various shipment service options or portions of available shipment service options. For example, with reference back to FIG. 2, an expanded shipment option 205 may display portions 210 and apportioned environmental impact information 215 associated with each portion, such as by selection of an expansion icon 220. As will be appreciated by one of skill in the art, in response to selection of an expansion icon 220, the selected expansion icon 220 is transformed into a contraction icon 225, and the corresponding elements 210 and apportioned environmental impacts 215 are displayed.

In an embodiment, the environmental estimator 120 may create a custom shipment service option 230 having a reduced environmental impact 245 that is less than the other available shipment service options displayed in the first column 145. For example, suppose a first carrier utilizes environmentally efficient equipment on the east coast, a second carrier utilizes environmentally efficient equipment on the west coast, and a third carrier utilizes environmentally efficient transcontinental equipment. The environmental estimator 120 may compare and evaluate different potential route segments between an origin and destination that are available from different carriers and create the custom shipment option 230 having portions 235 that provide reduced apportioned environmental impacts 240 to yield a reduced aggregate environmental impact 245. In one embodiment, the vendor of the estimation tool 120 acts as a broker between the user and the different carriers that the custom shipment option 230 includes. For example, the vendor of the environmental estimator 120 may invoice the user, and create the necessary transactions, invoices, financial transfers, and shipping labels to support the logistics required for the custom shipment option 230. It will be appreciated that while custom shipment options, such as the custom shipment option 230, may not be the lowest cost shipment option, they can reduce a company's environmental impact, such as carbon production for example. This may be particularly valuable to companies that are required (or have elected) to participate in financially based environmental regulations, such as carbon cap and trade programs, for example.

It will be appreciated that information provided by conventional shipping applications, such as rate and guaranteed delivery date for example, is standardized and may be readily compared between different available shipment service options. However, different calculation methodologies (as may be used by different carriers) may result in inconsistencies between environmental impact information corresponding to different available shipment service options. Further, deviations between prospective environmental data (used to calculate environmental information before shipment) and actual environmental data, such as shipment routes, may result in uncertainty surrounding presented environmental impact information.

In an embodiment, the environmental equalizer 131 evaluates provided environmental information from different carriers to increase accuracy and consistency therebetween within the table 140. The environmental equalizer 131 may operate in one or both of a predictive mode and a reporting mode, as described in further detail below.

When operating in a predictive mode, an embodiment of the environmental equalizer 131 defines carrier-specific hypothetical shipment-related criteria. In response to receipt of the carrier-specific hypothetical shipment-related criteria by the environmental equalizer 131, carrier-specific hypothetical shipment service options are thereby defined. The environmental equalizer 131 uses environmental data (including the operational/industrial information that may be received from sources other than the carrier) for developing and defining the carrier-specific hypothetical shipment-related criteria. The environmental equalizer 131 evaluates provided environmental data (which may include provided hypothetical environmental information) from a plurality of different carriers that correspond to the carrier-specific hypothetical shipment service options.

For example, the environmental equalizer 131 defines hypothetical shipment-related criteria including one or more of an origin, a destination, and a service level (e.g. ground or air express). This allows for consistent comparisons between different carriers that may each have different operational parameters, such as comparison of particular modes of contributions to environmental impact, for example. As a specific, non-limiting example, the environmental equalizer 131 defines an origin and destination that are separated by significant distance, but are each relatively close to an airport proximate to a known carrier processing center. Such hypothetical shipment-related criteria is contemplated to result in carrier-specific hypothetical shipment route segments such that air transportation contributes to a significant share of the aggregated environmental impact. As another illustrative, non-limiting example, the environmental equalizer 131 defines an origin and destination that each correspond to carrier processing centers that are further from an airport than each other. Such definition is contemplated to result in carrier-specific hypothetical shipment route segments such that ground transportation contributes to a significant share of the aggregated environmental impact.

Figure 6:
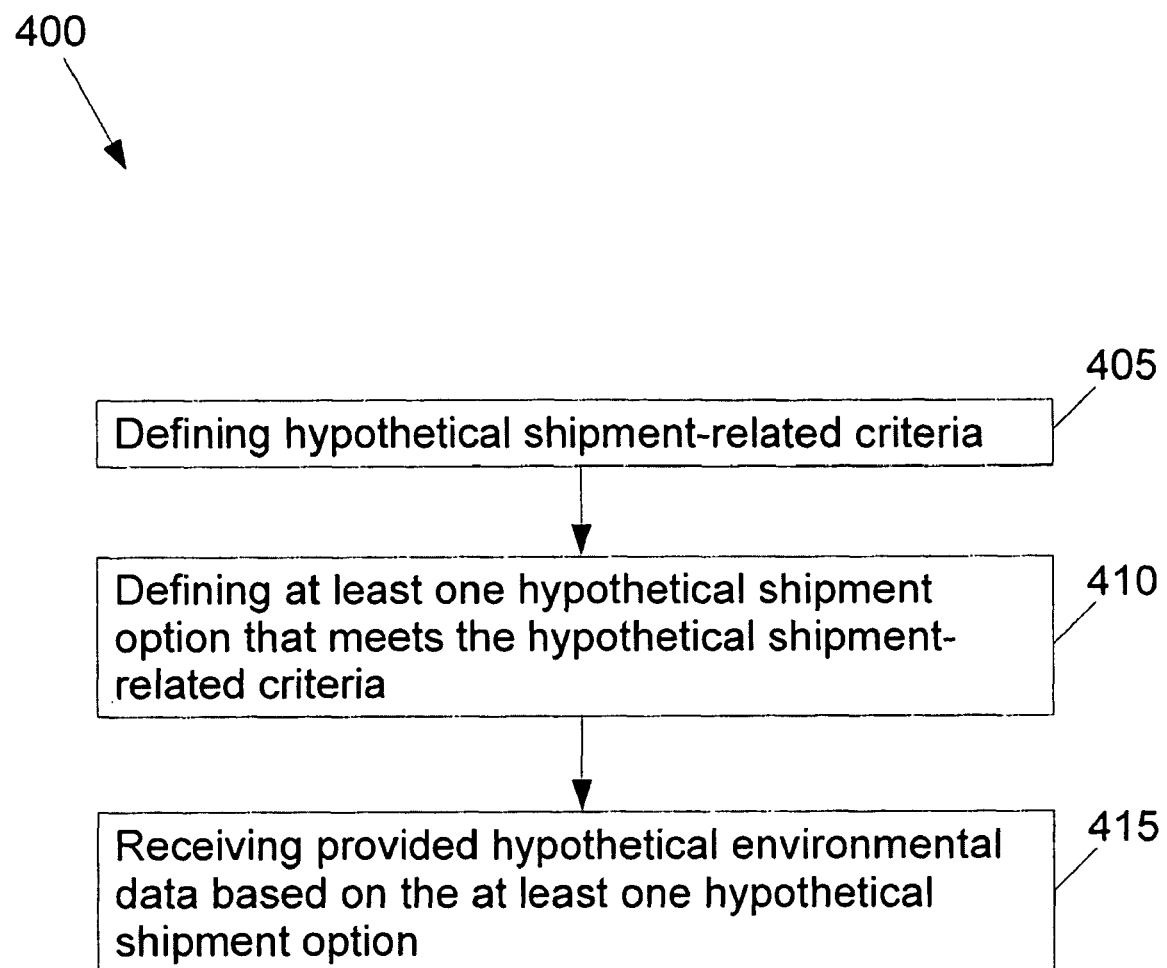
FIG. 6 depicts a flowchart of process steps of an environmental information equalizer in accordance with an embodiment of the invention.

Accordingly, FIG. 6 depicts a flowchart 400 of exemplary generalized process steps corresponding to operation of a predictive mode embodiment of the environmental equalizer 131. The process begins with defining hypothetical shipment-related criteria at step 405 and defining at least one hypothetical shipment option that meets the hypothetical shipment-related criteria at step 410. The process continues with receiving, at step 415, provided hypothetical environmental data (which, in some embodiments, may include provided hypothetical environmental information) based on the at least one hypothetical shipment option. In an embodiment, determining the environmental impact comprises applying the equalization factor, which is based upon the environmental data, thereto.

In one predictive mode embodiment, the environmental estimator 120 including the environmental equalizer 131 provides carrier-specific hypothetical shipment-related criteria to a carrier and receives corresponding provided hypothetical environmental information. For example, the estimator 120 may provide to a carrier an origin and destination of hypothetical shipment-related criteria defined by the environmental impact equalizer 131 and request therefrom the corresponding provided hypothetical environmental information. The environmental estimator 120 may then divide the provided hypothetical environmental information by a unit of interest to create normalized provided hypothetical environmental information.

The estimator 120 may use the hypothetical shipment-related criteria and the environmental data to account for factors that are understood to result in differences between provided hypothetical environmental information. Continuing the example above, exemplary normalized provided hypothetical environmental information includes a distance normalization of the air transportation impact, such as 0.75 lbs of carbon dioxide produced per mile of air transportation. It will be appreciated that the exemplary hypothetical shipment-related criteria and environmental data described herein can be used to develop a variety of normalized provided environmental information based on different units of interest, such as a volume normalization, an equipment normalization, a mass normalization, and combinations thereof.

Normalized provided hypothetical environmental information is recorded and differences thereof between different carriers are compared to generate carrier-specific equalization factors that reduce the differences. The carrier-specific equalization factors may then be applied to subsequent provided environmental information. For example, if normalized provided hypothetical environmental information from a first carrier is 10% above normalized provided hypothetical environmental information from a second carrier, the environmental impact estimator 120 applies an appropriate equalization factor that reduces the difference, such as an equalization factor that decreases provided environmental information from the first carrier by 10% relative to the second carrier. In an embodiment, the estimator 120 is responsive to user selection of a selection box 250 (see FIG. 2) to apply the equalization factor to the provided environmental information, and display the resulting estimated environmental information in the fifth column 165. Accordingly, the environmental equalizer 131 may provide or enforce a consistency of provided environmental information from different carriers.

Figure 7:
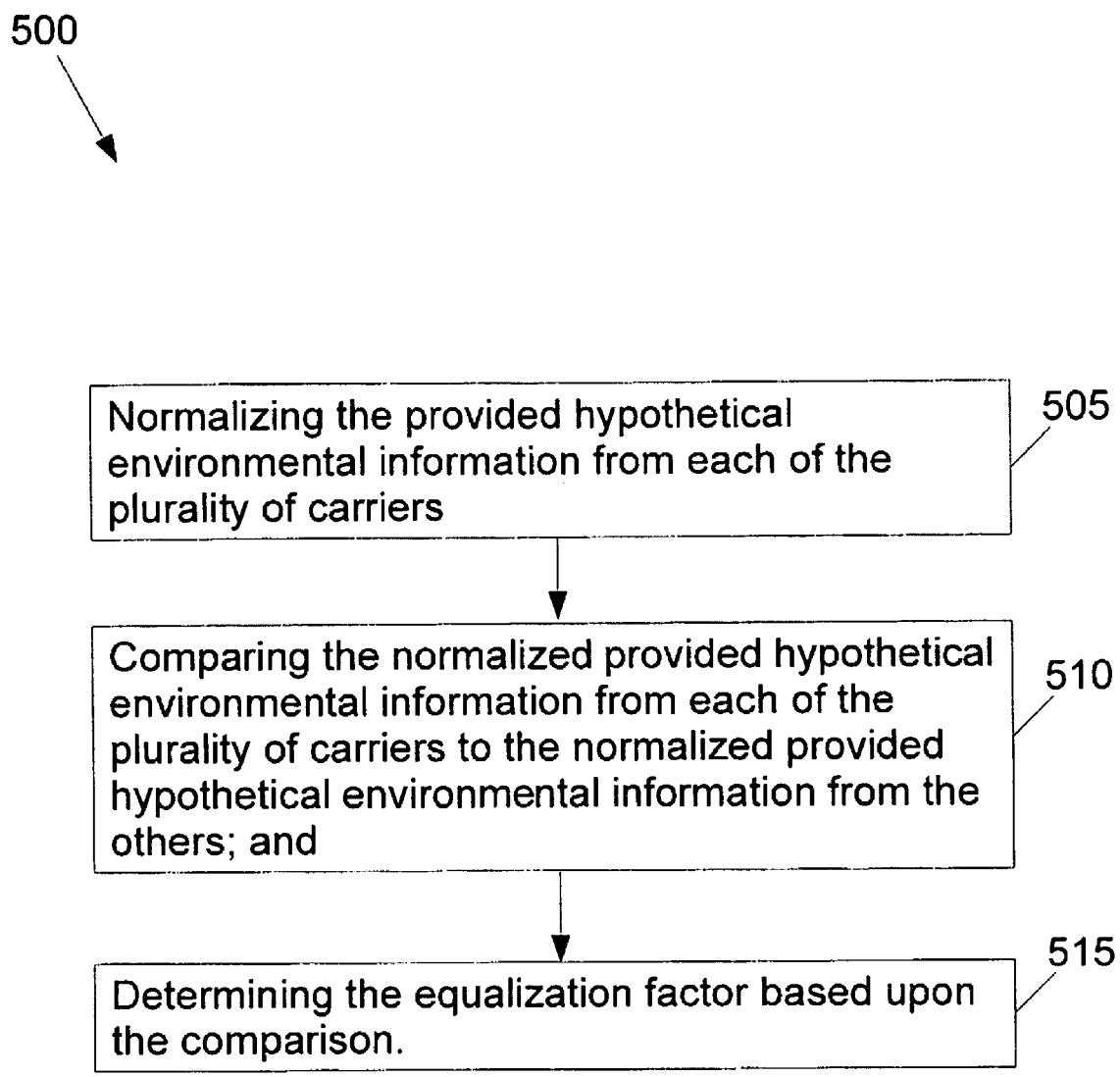
FIG. 7 depicts a flowchart of process steps of an environmental information equalizer in accordance with an embodiment of the invention.

Accordingly, FIG. 7 depicts a flowchart 500 of generalized process steps corresponding to the foregoing embodiment of the predictive mode of the environmental equalizer 131. The process begins at step 505 with normalizing the provided hypothetical environmental information from each of the plurality of carriers, and comparing, at step 510, the normalized provided hypothetical environmental information from each of the plurality of carriers to the normalized provided hypothetical environmental information from the others. The process further includes determining, at step 515, the equalization factor based upon the comparison.

In another predictive mode embodiment, the environmental equalizer 131 generates estimated hypothetical environmental information (also herein referred to as a "reference estimate") for the carrier-specific hypothetical shipment route portion and compares it to provided hypothetical environmental information. Differences between the two can be recorded and utilized to generate a carrier-specific equalization factor that may be applied to provided environmental information. For example, if provided hypothetical environmental information from a first carrier is 10% above a reference estimate of the environmental impact estimator 120 and provided hypothetical environmental information from a second carrier is 15% below a corresponding reference estimate, application of the equalization factor decreases subsequent provided environmental information from the first carrier by 10% and increases subsequent provided environmental impact information from the second carrier by 15%. It will be appreciated that an average of a plurality of provided hypothetical environmental information (from a single carrier) may be compared to an average of a plurality of corresponding reference estimates to develop the equalization factor. In an embodiment, the estimator 120 is responsive to user selection of the selection box 250 to apply the equalization factor to the provided environmental information, and the resulting estimated environmental information is thereby displayed in the fifth column 165.

When operating in a reporting mode, an embodiment of the environmental equalizer 131 receives and compares actual environmental information reported by a plurality of different carriers subsequent to shipment delivery. The reporting mode uses reported actual environmental information that may be available from delivery tracking status reports of actual deliveries to infer cross-carrier estimation variations. For example, it is contemplated that carriers will report actual environmental information following the shipment, in a manner similar to shipment tracking progress information that is presently available via shipper websites. The actual (reported) environmental impact information is stored. As described above, the tool 120 normalizes and compares each carrier's reported actual environmental information corresponding to appropriately similar shipment-related criteria, and differences therebetween are recorded. These differences are evaluated and used to infer cross-carrier variances in provided environmental information. As described above with reference to the predictive mode of the environmental equalizer, the tool 120 generates a carrier-specific equalization factor that may be applied to subsequent provided environmental information from the corresponding carrier to thereby provide estimated environmental information.

An embodiment of the environmental impact estimator 120 may include the environmental validator 132 to quantify a confidence value associated with the displayed environmental information. The environmental validator 132 evaluates environmental data that influence the provided environmental information to develop a confidence factor 255 associated with the provided environmental information. For example, as described herein, the provided environmental information is based upon prospective (contemplated) environmental data, such as shipment via specific portions of a specific route. However, in actuality, the carrier may send the shipment via different portions of a different route than contemplated, thereby resulting in environmental information that differs from the provided environmental information.

An embodiment of the environmental validator 132 records a plurality of shipment-related criteria and corresponding prospective environmental data. The environmental validator 132 further records actual environmental data corresponding to the same shipment-related criteria, such as actual route portions related to shipments performed by the carrier. For example, actual environmental data including actual carrier shipment route portions can be provided directly by the carrier. Actual environmental data can also be derived indirectly, such as via information from a shipment tracking/progress application, as is known in the art. Such tracking applications typically provide detailed information of a shipment's progress, including scan in and scan out times and locations as the shipment progresses through the different segments and portions of the shipment route from the origin to the destination. For example, actual environmental data, such as actual equipment used, may be dependent upon (and thereby inferred or derived from) actual shipment elements, or may be available independently. It will be appreciated that prospective and actual environmental data may include provided and actual environmental information, respectively.

The environmental validator 132 compares and records differences between corresponding prospective environmental data and actual environmental data. Using statistical analysis, such as confidence interval calculation methods for example, the environmental validator 132 calculates the confidence factor 255 based upon the carrier's historically demonstrated probability to deliver the shipment via the prospective environmental data upon which the provided environmental information that may be displayed in the fifth column 165 is based. In an exemplary embodiment, a confidence factor 260 is based upon the carrier's historically demonstrated probability to deliver the shipment via the shipment route portions 210 upon which the displayed environmental impact information 265 is estimated.

In a further embodiment, the environmental validator 132 utilizes the statistical analysis of the comparisons, generates anticipated environmental data, and calculates estimated environmental information that may be displayed as a validated estimate 270 that is based upon the anticipated environmental data. Stated alternatively, the validated estimate 270 is a refinement of the provided environmental impact information for a shipment option, and is based upon historical differences between prospective and actual environmental data corresponding to the shipment option. The environmental validator 132 provides an increased confidence to predict that the environmental impact that results from a user's commercial shipping activities does not exceed certain limits. This is contemplated to be of particular value to companies that are required (or elect) to participate within carbon "cap and trade" programs, for example. Embodiments of the validated estimate 270 may incorporate the "environmental equalizer" described to enhance and improve the prediction accuracy of the table 140.

Figure 8:
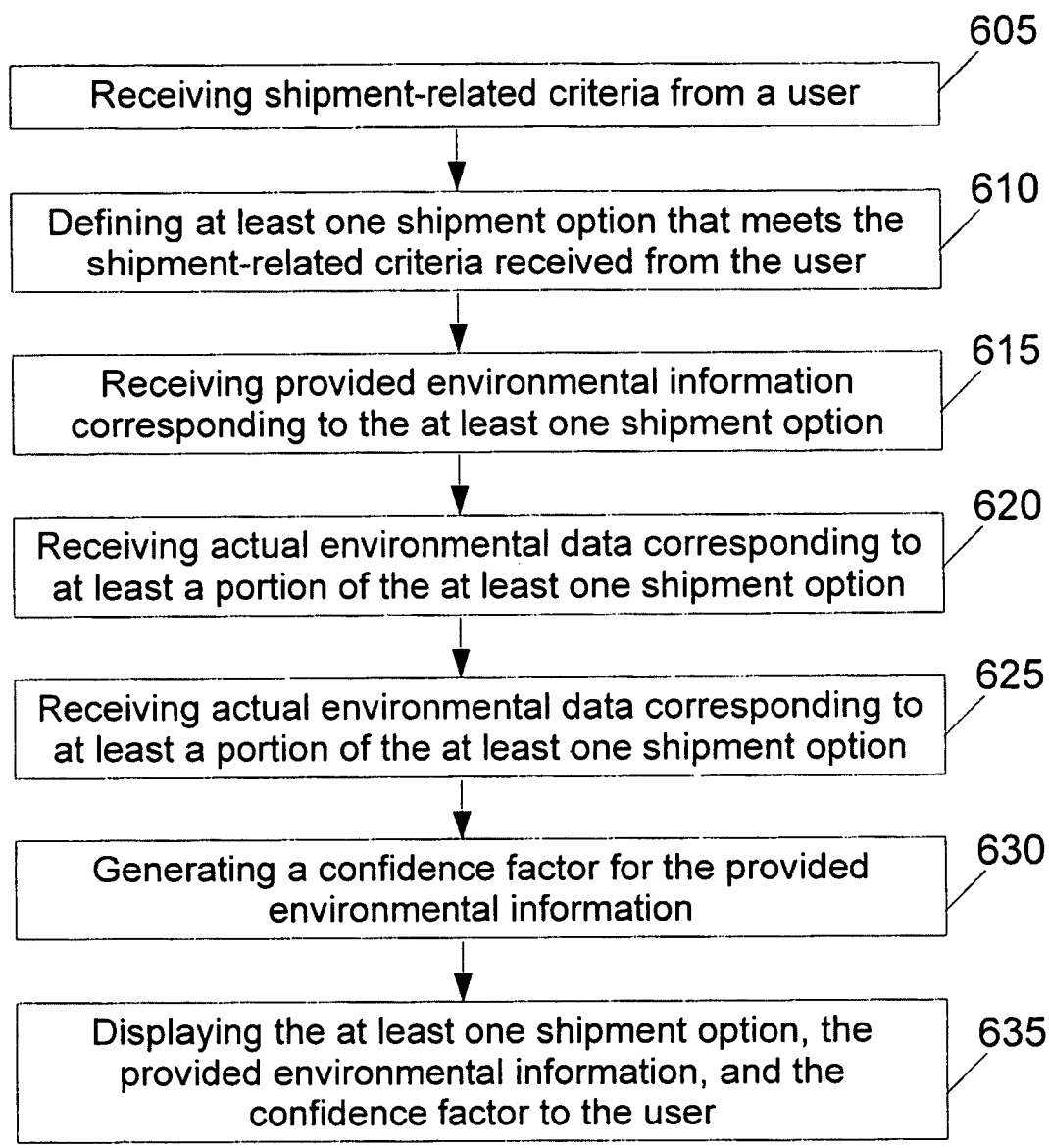
FIG. 8 depicts a block schematic diagram of a processing system that may implement the environmental estimator in accordance with an embodiment of the invention.

Accordingly, FIG. 8 represents a flowchart 600 of generalized process steps corresponding to operation of an embodiment of the environmental validator 132. The process begins at step 605 by receiving shipment-related criteria from a user and defining one or more shipment options that meet the shipment-related criteria received from the user at step 610. The process continues with step 615 and receiving provided environmental impact information corresponding to the one or more shipment options. The process proceeds at step 620 with receiving actual environmental data corresponding to at least a portion of the one or more shipment options. At step 625 the process includes generating a confidence factor that is based on actual environmental data for the provided environmental impact information. The process further includes displaying upon presenter 124, at step 630, the one or more shipment options, the provided environmental impact information, and the confidence factor. Step 635 includes storing, such as within mass storage 104, a selection received from the user of one shipment option from the one or more shipment options.

Figure 9:
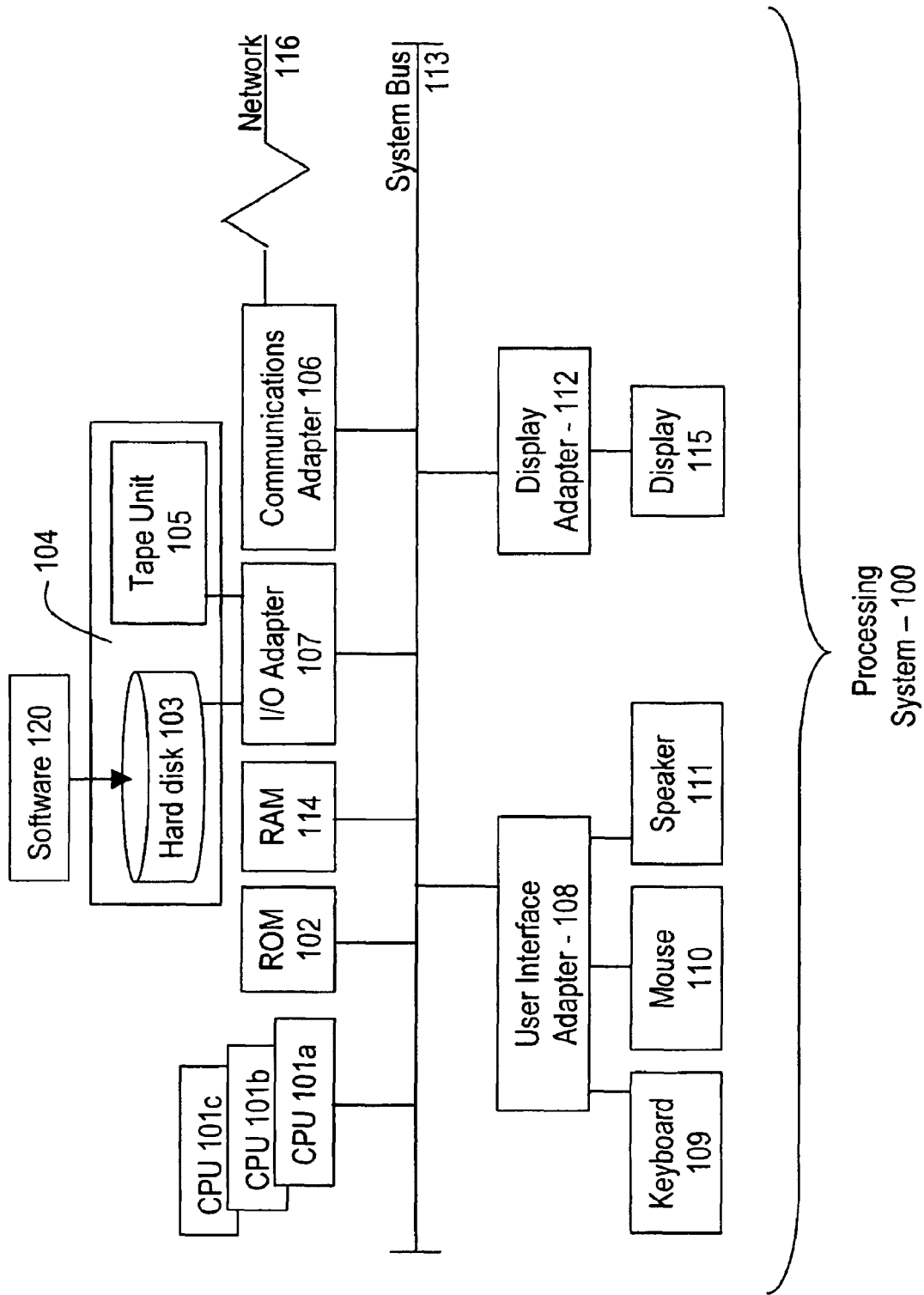
FIG. 9 depicts a block schematic diagram of an infrastructure for implementing the teachings herein.

As disclosed, some embodiments of the invention may include some of the following advantages: Carriers and/or the vendor of the estimator 120 can archive and analyze common shipment choices to recommend potential improvements. For example one carrier would be well-served from one or both of an environmental or economic perspective to invest in an additional sorting center located at a particular location, or to update equipment at a specific location; overall reduction in environmental impact resulting from selection of the custom shipment option; an ability to avoid particular environmental impact thresholds; and an ability to maximize return of participation in financially based environmental regulation FIG. 9 depicts an embodiment of a processing system 100 that may be used to implement the environmental estimator 120 as taught herein. In this embodiment, the system 100 has one or more central processing units (processors) 101a, 101b, 101c, etc. (collectively or generically referred to as processor (s) 101). In an embodiment, each processor 101 may include a general-purpose microprocessor. Processors 101 are coupled to system memory 114, such as random access memory (RAM) and various other components via a system bus 113. Read only memory (ROM) 102 is coupled to the system bus 113 and may include a basic input/output system (BIOS), which controls certain basic functions of system 100.

FIG. 9 further depicts an input/output (I/O) adapter 107 and a communications adapter 106 (also referred to as a "network interface") coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are examples of, and collectively referred to herein as mass storage 104. The communications adapter 106 interconnects bus 113 with a network 116 enabling data processing system 100 to communicate with other such systems. A display monitor 115 is an example of the presenter 124 and may be connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). The data receptor 121 and data presenter 124 include input/output devices that can be connected to system bus 113 via user interface adapter 108 and display adapter 112. A keyboard 109 and mouse 110 are examples of the receptor 121. The keyboard 109, mouse 110, and a speaker 111 may be interconnected to bus 113 via user interface adapter 108, which may include, for example, a Super I/O chip integrating multiple device adapters into a single integrated circuit.

Thus, as configured in FIG. 9, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device.

Examples of operating systems that may be supported by the system 100 include Windows 95, Windows 98, Windows NT 4.0, Windows XP, Windows 2000, Windows CE, Windows Vista, Macintosh, Java, LINUX, and UNIX, or any other suitable operating system. The system 100 also includes the network adapter 106 for communicating over the network 116. The network 116 can be a local-area network (LAN), a metro-area network (MAN), or wide-area network (WAN), such as the Internet or World Wide Web.

Users of the system 100 can connect to the network 116 through any suitable network interface 106 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the environmental impact estimator 120 may include machine readable instructions stored on machine readable media (for example, the hard disk 103) for capture and presentation of environmental impact information via the environmental presenter 124, such as upon on the screen 115, for example. The instructions may include "software," which may be produced using software development tools as are known in the art. The instructions may include various tools and features for providing user interaction capabilities as are known in the art.

Figure 10:
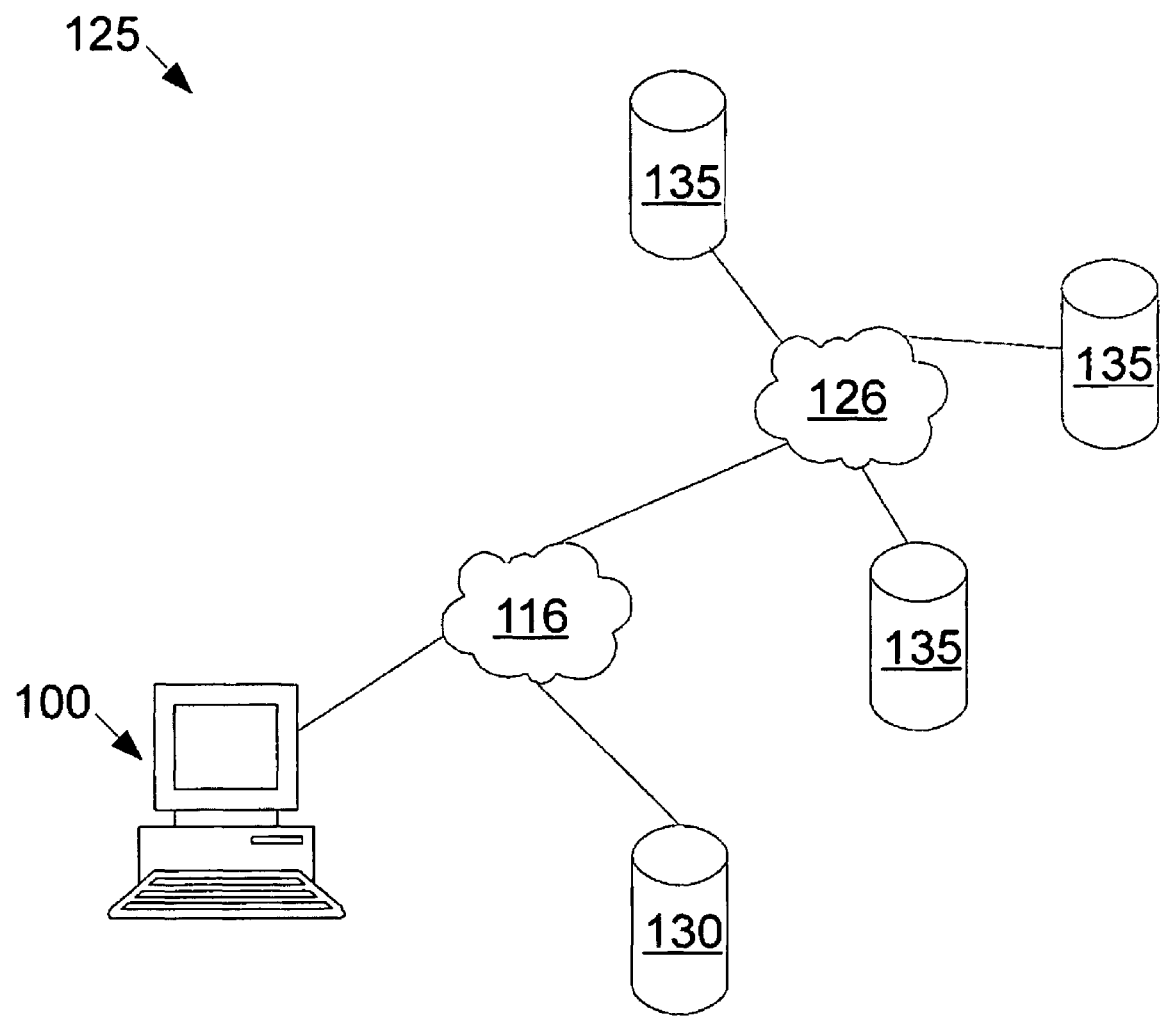
FIG. 10 depicts an exemplary schematic view of an infrastructure for implementing the teachings herein.

FIG. 10 depicts an exemplary schematic view of an infrastructure 125 for implementing the teachings herein. Infrastructure 125 includes system 100 configured as a user interface 100, a first network 116 in signal communication with the system 100, and a second network 126 in signal communication with the system 100 via the first network 116. For example, first network 116 may include a LAN through which user interface 100 is connected to additional systems 100 (not shown), or shared mass storage 130, and second network 126 may include the Internet and provide signal communication to one or more remote mass storage devices 135. Remote mass storage devices 135 may be part of any of a data center of a vendor of the tool 120, data bases of one or more of the carriers, and third party databases. Some embodiments may include one or more periodic updates to dynamic environmental data provided by infrastructure 125 via remote network 126.

In an embodiment, described as a desktop application, the machine readable instructions and environmental data are stored within mass storage 104 associated with the system 100, and updates are delivered to mass storage 104 by an online service via the Internet 126 on a regular basis. These updates may be from one or more of a vendor of the environmental estimator 120, a third party that provides potentially "real time" environmental data updates, and the different shipment carriers, such as the United States Post Office (USPS), United Parcel Service (UPS), and Federal Express, for example. In one embodiment, the provided environmental information associated with a shipment option is provided by the carrier corresponding thereto via network 126 for retrieval by the environmental estimator 120 and display within the table 140.

Another embodiment is known as an enterprise application, in which at least one of the machine readable instructions, the environmental data, and the environmental information are within shared mass storage 130. The machine readable instructions, environmental data, and/or environmental information within shared mass storage 130 are shared by a plurality of user interfaces 100 via local network 116, which receives updates of at least one of the machine readable instructions, the environmental data, and the environmental information via remote network 126. Another exemplary arrangement is known as a web-based application, in which at least one of the machine readable instructions, the environmental data, and the environmental information are stored within remote mass storage 135 and are accessed by one or more user interfaces 100 via the Internet 126, for example.

In an embodiment of the enterprise application, the environmental estimator 120 retrieves from shared mass storage 130 various environmental data and calculates an estimate of environmental impact information for display in the fifth column 165. Alternatively, the environmental impact estimator 120 retrieves environmental information stored within the shared mass storage 130. In one embodiment of the web-based application, the environmental impact estimator 120 polls one or more databases within one or more remote mass storage devices 135 to retrieve the environmental data, calculate, and display the appropriate environmental impact information. Alternatively, the environmental impact estimator 120 retrieves from one or more remote mass storage devices 135 and displays the provided environmental information.

An embodiment of the invention may be embodied in the form of computer-implemented processes and apparatuses for practicing those processes. Embodiments of the present invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. Embodiments of the invention also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to quantify and display physical environmental impacts associated selection of an available shipment service option.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A computer-implemented method of offering shipment options for selection, the method comprising:
   receiving, by a processor, shipment-related criteria from a user;
   defining at least one shipment option that meets the shipment-related criteria received from the user;
   receiving a shipment route and provided environmental impact corresponding to the at least one shipment option from at least one carrier;
   determining, by the processor, an estimated environmental impact corresponding to the at least one shipment option, wherein determining the estimated environmental impact for the at least one shipment option comprises:
   adjusting the provided environmental impact for the at least one shipment option based on at least one of:
      analyzing an estimated environmental impact of a hypothetical shipment option, and
      comparing the provided environmental impact to actual environmental data;
   verifying an accuracy of the provided environmental impact;
   displaying the at least one shipment option with the corresponding estimated environmental impact to the user; and
   storing a selection of one of the at least one shipment option received from the user.

2. The method of claim 1, further comprising: based upon the estimated environmental impact, defining a custom shipment option having an environmental impact less than the estimated environmental impact of the at least one shipment option.

3. The method of claim 1, wherein the step of adjusting the provided environmental impact comprises comparing the provided environmental impact to actual environmental data, and wherein the actual environmental data comprises an actual environmental impact reported for a previously-used shipment option.

4. The method of claim 1, further comprising: defining hypothetical shipment-related criteria; defining the hypothetical shipment option to meet the hypothetical shipment-related criteria; and receiving a provided hypothetical environmental impact based on the hypothetical shipment option from each of a plurality of carriers; wherein the step of determining the estimated environmental impact comprises applying an equalization factor to the provided environmental impact, the equalization factor based on the provided hypothetical environmental impact.

5. The method of claim 4, wherein the step of determining the estimated environmental impact comprises: normalizing the provided hypothetical environmental impact from each of the plurality of carriers; comparing the normalized provided hypothetical environmental impact from each of the plurality of carriers to the normalized provided hypothetical environmental information from the others; and determining the equalization factor based upon the comparison.

6. The method of claim 5, wherein the step of normalizing comprises: dividing the provided hypothetical environmental impact from each of the plurality of carriers by a unit of interest.

7. The method of claim 4, wherein the comparing comprises: generating an estimated hypothetical environmental impact for each of the plurality of carriers; wherein the step of determining the estimated environmental impact further comprises comparing the provided hypothetical environmental impact for each of the plurality of carriers to the corresponding estimated hypothetical environmental information; and the equalization factor is based on the comparison.

8. The method of claim 1, wherein the step of adjusting the provided environmental impact for the at least one shipment option further comprises applying a carrier-specific equalization factor based on the carrier associated with the at least one shipment option.

9. A computer-implemented method of offering shipment options for selection, the method comprising:
   receiving, by a processor shipment-related criteria from a user;
   defining at least one shipment option that meets the shipment-related criteria received from the user;
   receiving environmental data corresponding to the at least one shipment option;
   determining, by the processor, an environmental impact corresponding to the at least one shipment option based on the environmental data;
   displaying the at least one shipment option with the corresponding environmental impact to the user;
   storing a selection of a shipment option by the user;
   defining hypothetical shipment-related criteria;
   defining at least one hypothetical shipment option that meets the hypothetical shipment-related criteria; and
   receiving provided hypothetical environmental data based on the at least one hypothetical shipment option;
   wherein the step of determining the environmental impact comprises applying an equalization factor to the environmental data, the equalization factor based on the provided hypothetical environmental data.

10. The method of claim 9, wherein the provided hypothetical environmental data comprises provided hypothetical environmental information received from each of a plurality of carriers.

11. The method of claim 10, wherein: the step of determining the environmental impact comprises: normalizing the provided hypothetical environmental information from each of the plurality of carriers; comparing the normalized provided hypothetical environmental information from each of the plurality of carriers to the normalized provided hypothetical environmental information from the others; and determining the equalization factor based upon the comparison.

12. The method of claim 10, further comprising: generating estimated hypothetical environmental information for each of the plurality of carriers; wherein the step of determining the environmental impact further comprises comparing the provided hypothetical environmental information for each of the plurality of carriers to the corresponding estimated hypothetical environmental information; and the equalization factor is based on the comparison.

13. The method of claim 9, comprising: receiving actual environmental information from each of a plurality of carriers; wherein the step of determining the environmental impact comprises: normalizing the actual environmental information from each of the plurality of carriers; comparing the normalized actual environmental information from each of the plurality of carriers to the normalized actual environmental information from the others; and applying an equalization factor to the environmental data, the equalization factor based upon the comparison.

14. The method of claim 9, wherein: the step of receiving environmental data comprises receiving provided environmental data corresponding to a plurality of route segments of the at least one shipment option; and the step of determining the environmental impact corresponding to the at least one shipment option further comprises: calculating an environmental impact corresponding to each of the route segments based on the provided environmental data corresponding to the respective route segment; and aggregating the calculated environmental impact to obtain a total environmental impact for the at least one shipment option.

15. A computer-implemented method comprising: receiving shipment-related criteria from a user;
defining at least one shipment option that meets the shipment-related criteria received from the user;
receiving provided environmental information corresponding to the at least one shipment option;
receiving actual environmental data corresponding to at least a portion of the at least one shipment option;
receiving prospective environmental data corresponding to at least a portion of the at least one shipment option; and
comparing the prospective environmental data to the actual environmental data; wherein the confidence factor is based upon the comparison.
using the actual environmental data, generating a confidence factor for the provided environmental information;
displaying the at least one shipment option, the provided environmental information, and the confidence factor to the user; and
storing a selection of one shipment option from the at least one shipment option received from the user.

16. The method of claim 15, wherein: the actual environmental data comprises actual environmental information; and the prospective environmental data comprises provided environmental information.

17. The method of claim 15, further comprising:
calculating estimated environmental information for the at least one shipment option, the estimated environmental information being calculated independent of the provided environmental information; and
displaying the estimated environmental information for the at least one shipment option to the user.

18. The method of claim 17, further comprising:
receiving prospective environmental data corresponding to at least a portion of the at least one shipment option; and
comparing the prospective environmental data to the actual environmental data; wherein the step of calculating estimated environmental information is based upon the comparing.

* * * * *